J. O. PRENZEL.
MACHINE FOR MANUFACTURING PRIMING BANDS.
APPLICATION FILED JULY 21, 1910.

1,012,434.

Patented Dec. 19, 1911.
9 SHEETS—SHEET 2.

J. O. PRENZEL.
MACHINE FOR MANUFACTURING PRIMING BANDS.
APPLICATION FILED JULY 21, 1910.

1,012,434.

Patented Dec. 19, 1911.
9 SHEETS—SHEET 3.

Witnesses:
P. J. Swinton
C. J. Kesler

Inventor
Julius O. Prenzel
By
James L. Norris Jr.
Atty

J. O. PRENZEL.
MACHINE FOR MANUFACTURING PRIMING BANDS.
APPLICATION FILED JULY 21, 1910.

1,012,434.

Patented Dec. 19, 1911.
9 SHEETS—SHEET 4.

J. O. PRENZEL.
MACHINE FOR MANUFACTURING PRIMING BANDS.
APPLICATION FILED JULY 21, 1910.

1,012,434.

Patented Dec. 19, 1911.

Witnesses:

Inventor
Julius O. Prenzel

J. O. PRENZEL.
MACHINE FOR MANUFACTURING PRIMING BANDS.
APPLICATION FILED JULY 21, 1910.

1,012,434.

Patented Dec. 19, 1911.

Witnesses:
P. J. Simonton
Ces Kesler

Inventor
Julius O. Prenzel
By
James L. Norris.
Atty

J. O. PRENZEL.
MACHINE FOR MANUFACTURING PRIMING BANDS.
APPLICATION FILED JULY 21, 1910.

1,012,434.

Patented Dec. 19, 1911.
9 SHEETS—SHEET 8.

Fig. 14.

Witnesses:

Inventor
Julius O. Prenzel

J. O. PRENZEL.
MACHINE FOR MANUFACTURING PRIMING BANDS.
APPLICATION FILED JULY 21, 1910.

1,012,434.

Patented Dec. 19, 1911.
9 SHEETS—SHEET 9.

UNITED STATES PATENT OFFICE.

JULIUS OSWALD PRENZEL, OF BERLIN, GERMANY.

MACHINE FOR MANUFACTURING PRIMING-BANDS.

1,012,434.  Specification of Letters Patent.  Patented Dec. 19, 1911.

Application filed July 21, 1910. Serial No. 573,064.

*To all whom it may concern:*

Be it known that I, JULIUS OSWALD PRENZEL, subject of the Emperor of Germany, residing at No. 49 Turmstrasse, Berlin, Germany, have invented new and useful Improvements in Machines for Manufacturing Priming-Bands, of which the following is a specification.

My invention relates to improved machines for manufacturing priming bands or strips, and the object of my invention is to produce such priming or fuse-bands from lignin or cellulose or similar material in one continuous operation, the said priming or fuse-bands or strips being destined to serve as igniting fuses in pocket-lamps and other lighting apparatus of any kind.

As to its sequence of operations, the invention, broadly, consists in first, cutting from a blank or sheet of a suitable material, preferably of lignin or cellulose in the form of paste-board, bands or strips of the desired width, the cutting being performed by passing the blank or sheet through cutting rollers or other suitable cutting apparatus, then the said bands or strips are provided, in the direction of their length, with a series of holes or recesses, properly distanced from each other, for receiving and retaining the priming substance or explosive matter. In producing said holes or recesses in the bands or strips, the material of said bands or strips is roughened or torn about or within such holes or recesses, for the purpose of causing the dots or globules of the explosive matter to secure a better hold within the said holes or recesses, and of preventing such globules from being thrown off during the further operations of the continuous work. When the explosive dots or globules on the bands or strips have been properly applied, folds or dashes are pressed into the band or strip behind every explosive dot or globule, to prevent the latter from being thrown off in rolling up the band or strip. The said strips or bands carrying the explosive dots or globules, then, are led over guide-rollers into a drying apparatus, through which they are made to travel repeatedly in order to get a complete drying of the explosive. On leaving the said drying-apparatus, the strips or bands are made to pass over a roller which rotates in the direction opposite to the course of the said bands or strips, said roller immersing with its lower side into a tank of fluid paraffin or a similar substance, whereby the bands or strips are coated on their lower side with the said fluid mass to increase their combustibility and facilitate ignition. To convey the bands or strips from the drying apparatus, they are caused to pass between rollers covered with an elastic material, said rollers being arranged outside of the drying apparatus. By the said feed-rollers the bands or strips are regularly delivered to a large receiving roller or drum, from which they may be run off, as desired, in a state ready for use or wound up to form small coils to be placed into pocket-lamps or any other igniting apparatus or implements.

Having thus explained the continuous course of the various operations which form the method of manufacturing priming or fuse-bands or strips, I will now proceed to further describe the means and machine by which the work is performed, reference being had to the accompanying drawings, in which:

Fig. 14 is a plan view of Fig. 13, and Figs. 15 and 16 illustrate an oil-brake applied to the receiving roller or drum.

Referring, first, to Figs. 1 to 4, it will be seen that the broad blank or sheet $x$, running off from a drum or roller, passes between a guide roller $a^2$ which feeds it forward between two cutting rollers $a$, $a^1$. Each of these cutting rollers consists of a drum $a^3$, $a^4$, carrying cutter-disks $a^5$, $a^6$, engaging between each other. The said cutter-disks are secured to the drums $a^3$, $a^4$, by means of heads $a^7$, and nuts $a^8$, screwed upon threads of the drum shaft, and by the aid of said nuts $a^8$, the whole set of cutter-disks $a^5$, $a^6$, may be readily adjusted toward the right or the left upon the drums $a^3$, $a^4$. By means of said cutter-disks the blank or sheet $x$ is severed into a number of narrow bands or strips, corresponding to the number of cutter-disks employed. From between the said cutter-disks the bands or strips cut from the blank are conveyed by guide-rollers $b$, $b^1$, to the perforator (Figs. 1, 2, 5 and 6). The said perforator consists of two rollers $c$, $c^1$, the lower one, $c^1$, of which is composed of a plurality of separate rings $c^4$, arranged upon a drum $c^3$ and provided with holes in their circumference. Between every adjacent pair of rings $c^4$, a guide-ring $c^5$ is placed upon the drum $c^3$ and between each pair of such guide-rings $c^5$, the strips of the sheet $x$ are fed forward, exactly fitting between said rings and accurately running over the perforated rings $c^4$. The upper one, $c$, of the pair of rollers $c$, $c^1$, is composed of a number of separate disks $c^6$, corresponding to the number of rings $c^4$; the said disks $c^6$, are provided with teeth at their circumference, and they are kept at the suitable distance apart by intermediate rings $c^7$, upon the drum $c^2$; forming a part of the roller $c$. The said disks $c^6$, and rings $c^7$, are held in place on the drums $c^2$, $c^3$, by means of heads $c^8$, and nuts $c^9$, screwed to the threaded portion of the shaft, as described with reference to the heads $a^7$ and nuts $a^8$. The teeth provided on the circumference of the disks $c^6$, are of peculiar shape and are adapted to bear upon the strips of the sheet $x$, which run over the roller $c^1$. By means of said teeth, the material of the bands or strips will be forced down into the hole that comes opposite the tooth and the point of the tooth will split or tear the edge of the hole or recess produced by the back of the tooth. Owing to the split or torn edge of the hole or recess, the explosive mass sunk into said hole or recess will take a hold therein and be firmly retained. Before entering between the perforating rollers $c$, $c^1$, the bands or strips are made to pass over a guide-roller $d$, having pins $d^1$, projecting upwardly from it, and between each pair of such pins the bands or strips $x$, are accurately guided onto the recessed rings $c^4$, and below the toothed punching disk $c^6$. To prevent the punched or recessed bands or strips from being raised by the point of the punching tooth, as it tears or splits the edge of the hole or recess produced, a ledge $d^2$, is arranged at the discharge side of the punching rollers $c$, $c^1$, the said ledge $d^2$, being recessed to guide the bands or strips on its lower side. From below the said guide-ledge $d^2$, the bands or strips are fed on to the dotting or filling apparatus, as shown in detail, Figs. 9 and 10. This apparatus consists of a hollow drum $e$, the circumference of which is provided with holes arranged in series parallel to the axis of the drum; the holes in each series are out of alinement with those of the adjacent series, as fully shown in Fig. 2, the holes or recesses produced in every two adjoining bands or strips being equally located out of alinement. One of the trunnions of the drum $e$, is preferably hollow, to feed the supply of explosive matter to be applied to the bands or strips. Each of the holes of the drum $e$, is designed to receive a distributing cylinder $e^1$ (Fig. 10) located within the drum and screwed into the hole. The said cylinders $e^1$, during the rotation of the drum $e$, are constantly stirring its contents. Each of the distributing cylinders $e^1$, has a piston $e^2$, adapted to slide within the cylinder, the piston carrying a distributing pin $e^3$, projecting from the outside end of the cylinder. The inside end of the cylinder is closed by a screw-cap $e^4$, and between said cap and the piston $e^2$, a coiled spring $e^5$, is located, which constantly tends to force outward the piston $e^2$, and pin $e^3$. Into the lower end of the cylinder $e^1$, an adjustable tubular piece $e^6$, is screwed, which serves to adjust the amount of explosive mass discharged from the cylinder. The said cylinders $e^1$ have apertures $e^7$, opening into the interior of the drum $e$, and through such apertures the fluid explosive matter within said drum $e$ will flow into the cylinder $e^1$ when it takes the position indicated at I in Fig. 10, and run down along the pin $e^3$ into the hole or recess in the band or strip. As the drum $e$, continues its rotation, the cylinder $e^1$ will come from position I into position II indicated in Fig. 10, and the spring $e^5$, accordingly, will advance the piston $e^2$, toward the outside. In its downward stroke the piston will force the pasty mass outward and along the pin $e^3$, thus aiding to lodge the drop or globule into the recess of the band $x$. The downward stroke of the piston also closes the apertures $e^7$ and prevents a further supply of the mass to the delivering pin.

The separate bands or strips, passing below the drum $e$, are supported by a suitable block $f$, and guided by webs or ledges $f^1$, which accurately lead the band below the delivering pin $e^3$. The said support $f$, rests upon a sliding piece $f^2$ (Fig. 9), having wedge-shaped faces, and by shifting said sliding piece $f^2$, the said support $f$, may be raised or lowered as desired. If, after starting the machine, during the time when the bands or strips have not yet reached the drum $e$, the delivery of explosive mass is of no use in the beginning of the operation, the slide $f^2$, may be drawn out in the direction of the arrow (Fig. 9); the support $f$, accordingly, will be lowered and the pins $e^3$ pushed outward by the springs $e^5$; when the said pins take their lowest position, the delivery of the explosive mass will be entirely stopped. If, then, the slide $f^2$ is again shifted inward, the support $f$, will be raised to its normal position and the pins $e^3$ be enabled to perform the delivery of the mass to the bands or strips. The head of the drum $e$, may be removed by removing the screw $f^3$ (Fig. 9), after which the drum may be cleaned inside.

Figure 9:
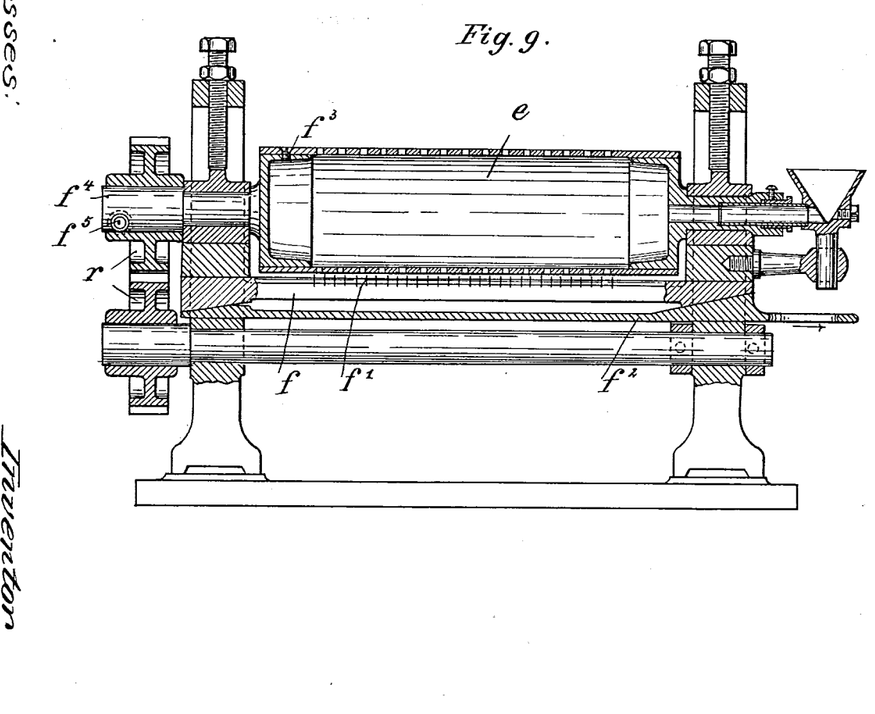
Figs. 9 and 10 serve to illustrate the apparatus for applying the dots or globules of explosive matter.
Figure 10:
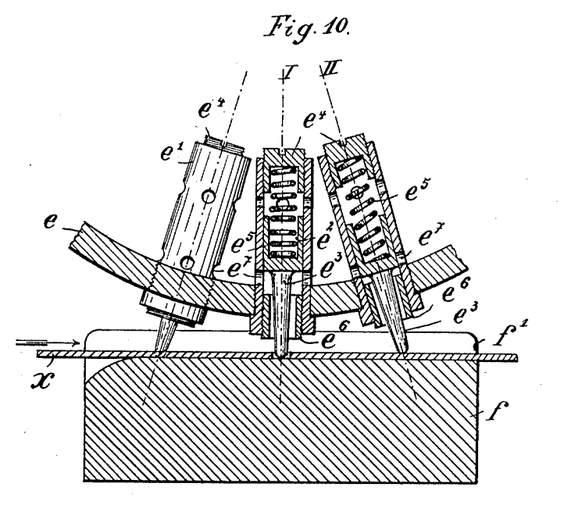
Figure 11:
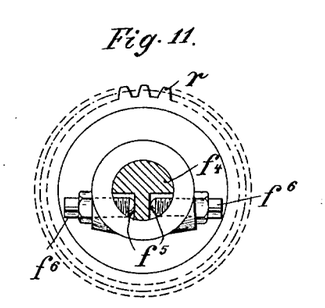
Fig. 11 represents a special device for adjusting the rollers by which the holes or recesses are produced in the bands and the explosive mass is filled into said holes or recesses.

In order to precisely adjust the drum $e$, in such a manner to make the delivering pins $e^3$, accurately enter the recesses in the band or strips, an adjusting device has been applied, as shown in Figs. 9, and 11. For this purpose the end of one of the trunnions $f^4$ of the drum $e$, has recesses $f^5$, $f^5$, cut into it, and the hub of the gear-wheel $r$ carried by said trunnion $f^4$, has bearings formed into it to receive screws $f^6$, $f^6$, engaging in the said recesses $f^5$. Thus by loosening one of the said screws $f^6$, and advancing the opposite one, the position of the drum $e$, with relation to its driving wheel is adjustable in a manner to make the delivering pins $e^3$ exactly fit the recesses of the bands or strips. An adjusting device of the same kind is also provided for the punching or perforating drum $c$, already described.

Figure 7:
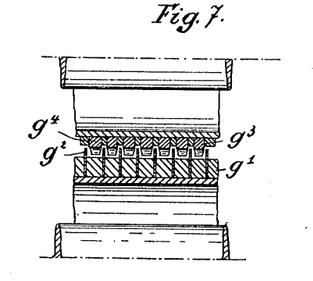
Figure 8:
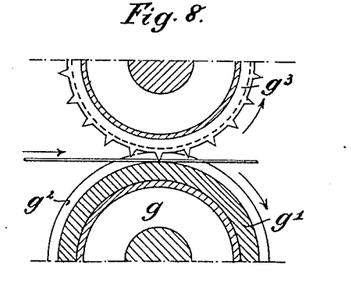

When the bands or strips have received the dots or globules of explosive mass deposited within the holes or recesses, as described, cross scores or dashes are punched or rolled into the band, in proximity to the dots or globules of the explosive mass, for the purpose of preventing the said dots from being thrown off when the bands are being rolled up. To provide such cross scores or dashes, the bands or strips are fed forward between a pair of rollers, shown in detail in Figs. 7, and 8. The lower one, $g$, of said rollers carries guide-rings $g^1$ on its circumference, with guide-webs or blades $g^2$, in them, to form channels between which the bands or strips are fed on below the upper roller which carries cutting-rings $g^3$, spaced apart by intermediate rings $g^4$. The division of the cutter points is exactly the same as that of the punching and delivering rollers $c$, $e$, whereby the scores or dashes across the bands or strips are precisely pressed into the same behind every dot or globule lodged in the recess.

Figure 1:
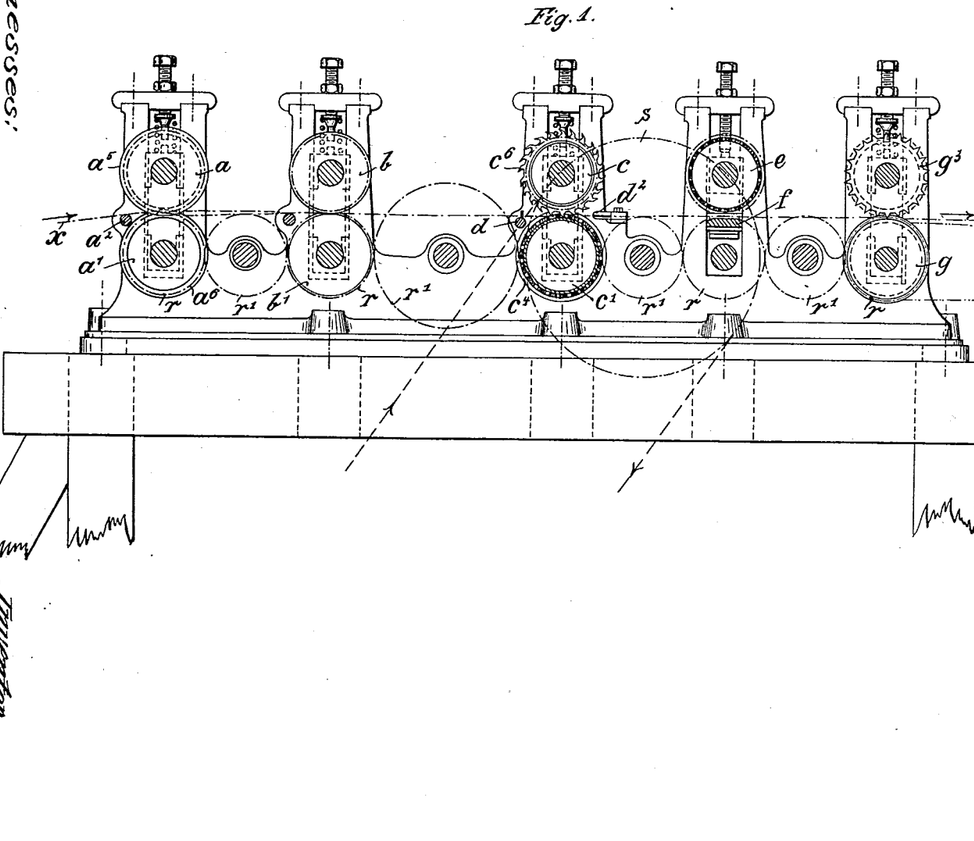
Figure 1 is a longitudinal section of the machine for manufacturing priming bands according to this invention.
Figure 2:
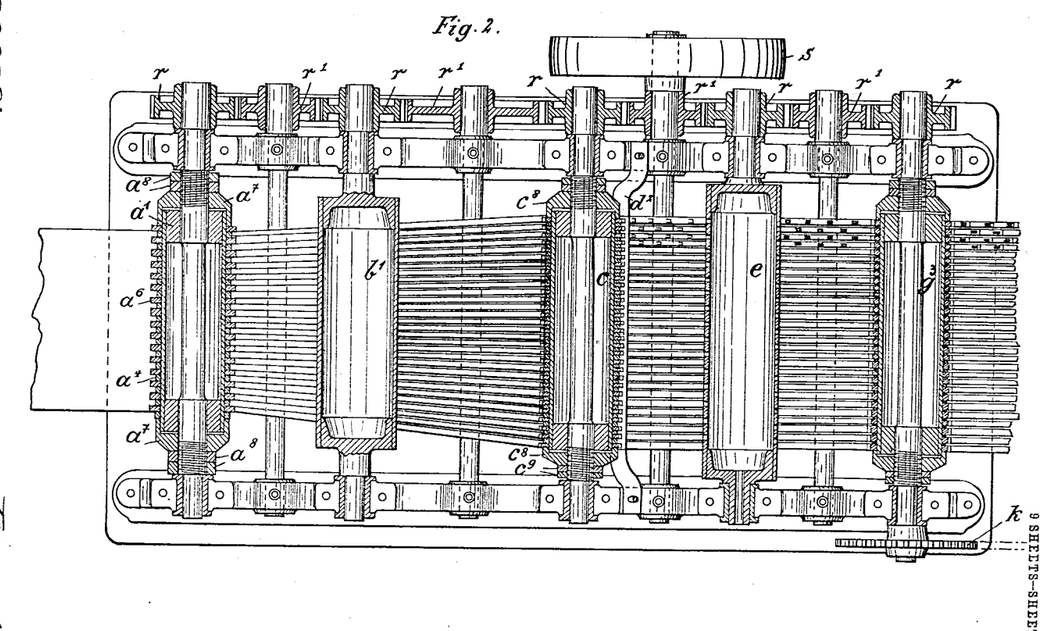
Fig. 2 is a plan of the same.
Figure 3:
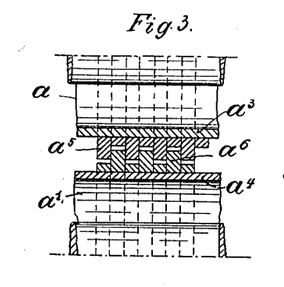
Figs. 3, 4, 5, 6, 7 and 8 serve to illustrate sundry details of the machine, drawn to a larger scale.
Figure 4:
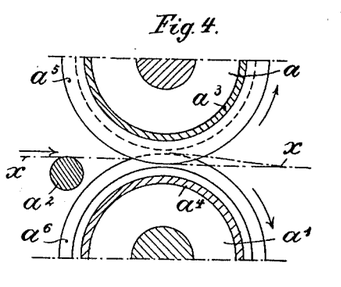
Figure 5:
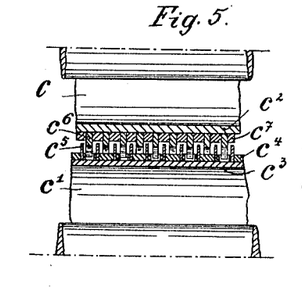
Figure 6:
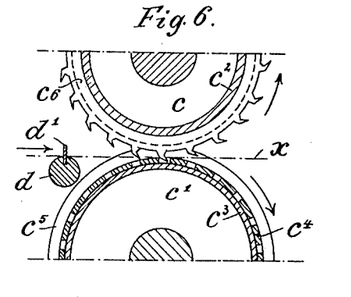

The whole set of rollers, as shown in Figs. 1, and 2, arranged in consecutive order, are driven from a common pulley $s$, from the shaft of which rotative motion is transmitted to the set of driving wheels $r$, and intermediate wheels $r^1$; from the lower roller or drum of each set the upper roller or drum is carried along by gearing of equal size.

Figure 12:
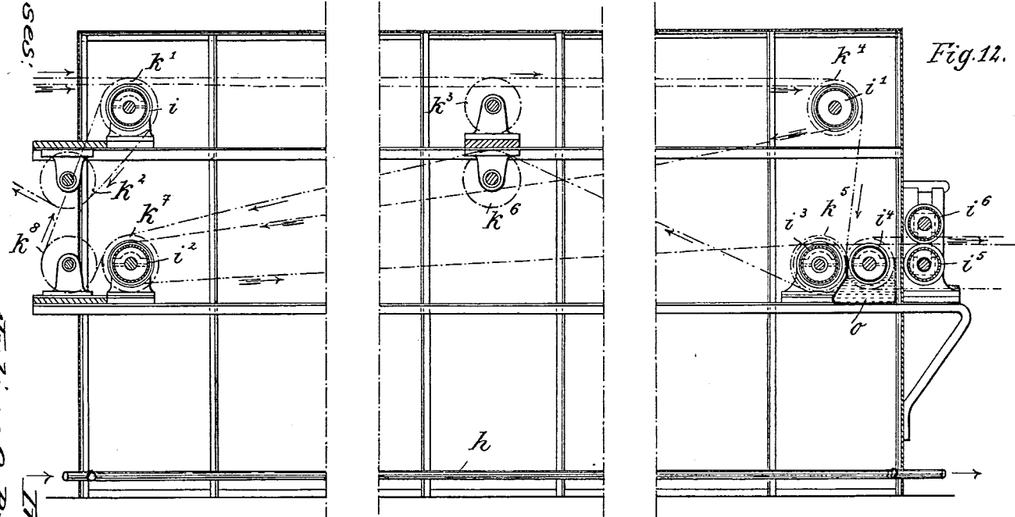
Fig. 12 illustrates the drying apparatus of the machine.

From the pair of rollers $g$, $g^3$, the bands or strips are delivered to the drying apparatus represented in Fig. 12. The said drying apparatus is heated by steam flowing through a pipe or pipes $h$, arranged at the bottom of the drying chamber, which, preferably, may be repeatedly traversed by said pipe or pipes, or the said pipes may form a heating coil.

Figure 13:
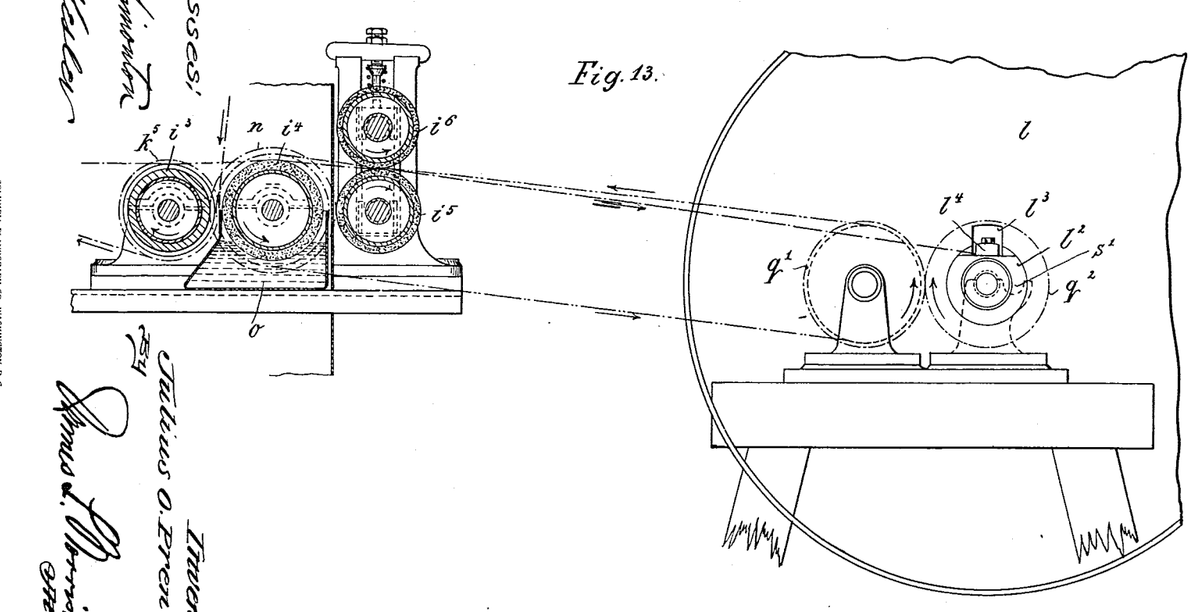
Fig. 13 shows the device for coating the fuse-bands with paraffin or the like, the receiving roll or drum being shown in longitudinal section.

The bands or strips, fed into the drying apparatus through roller $i$, are carried over a set of rollers $i^1$, $i^2$, $i^3$, $i^4$, and issue between a pair of rollers $i^5$, $i^6$, located outside of the drying apparatus, whence they are fed on to the receiving drum $l$, Fig. 13. On the way between the rollers $i^1$ and $i^2$, as also between the rollers $i^2$ and $i^3$, the bands or strips should be crossed to prevent their upper surface with the globules on it from coming into contact with the surface of the rollers. The rollers $i$, $i^1$, $i^2$, $i^3$, are provided with guide rings or blades, forming channels between them, in the manner described with reference to the rollers $c^1$, Figs. 5 and 6, the bands being guided and kept apart by said channels. Motion is imparted to the set of rollers $i$, $i^1$, $i^2$, $i^3$, by means of a driving chain carried over sprocket-wheels keyed to their shafts. A chain-wheel $k$, is mounted upon one end of the shaft of roller $g$ (Fig. 2) and from this wheel $k$, an endless chain passes around a sprocket-wheel $k^1$ on the shaft of roller $i$, and back over a guide-roller $k^2$ to the chain-wheel $k$. The opposite end of roller $i$ carries another sprocket-wheel, from which an endless chain passes over a guide roller $k^3$ to the sprocket-wheel $k^4$ on the shaft of roller $i^1$, thence to a sprocket-wheel $k^5$ on the shaft of roller $i^3$, thence over a guide roller $k^6$ to a sprocket-wheel $k^7$ on the shaft of roller $i^2$, and back over guide-roller $k^8$ to sprocket-wheel $k^1$. A gear-wheel $m$, on the shaft of roller $i^3$, transmits motion through the wheel $n$, to the shaft of roller $i^4$, which is made to turn in the direction opposite to that of roller $i^3$, and, accordingly, opposite to the forward or feeding direction of the bands $x$. The said roller $i^4$ is covered with felt or rubber and its lower side is immersed into a trough $o$ containing fluid paraffin or another fluid substance to be applied to the bands or strips, but to their lower side only. The said trough or tank $o$, being located within the drying chamber, is constantly heated and, therefore, keeps the molten paraffin in the fluid state. The two rollers $i^5$, $i^6$, the lower one of which receives motion through the gear-wheel $n$, on the shaft of the roller $i^4$, are located outside of the drying apparatus and they are covered with felt or rubber for conveying the bands $x$ farther on to the receiving drum $l$, to which rotary motion is imparted by a chain from the sprocket-wheel $q$, Fig. 14, and by gear-wheels $q^1$, $q^2$. The said drum is composed of a number of large sheet-metal disks $l^1$, arranged parallel to each other on the circumference of a cylinder and kept apart by spacing rings $l^2$. A segment is cut away from said rings $l^2$, and corresponding to said apertures the disks $l^1$ have an aperture $l^3$, through which a ledge $l^4$ is passed and screwed to the outer rings $l^5$, in series with the rings $l^2$, as clearly shown in Figs. 13 and 14. The front ends of the bands or strips are secured under said ledge $l^4$, and thereby retained; thus, as the drum $l$ revolves, the bands $x$ will be rolled up between the disks $l^1$ and upon the spacing rings $l^2$. As soon as a drum $l$, has been filled up, it is removed from its bearings and replaced by an empty drum. To facilitate the exchange of the drum without interfering with the gear wheels, two auxiliary bearings $s^1$ are provided for the shaft of the drum. The drum $l$, is first placed into said auxiliary bearings and thence lifted from the machine.

Figure 14:
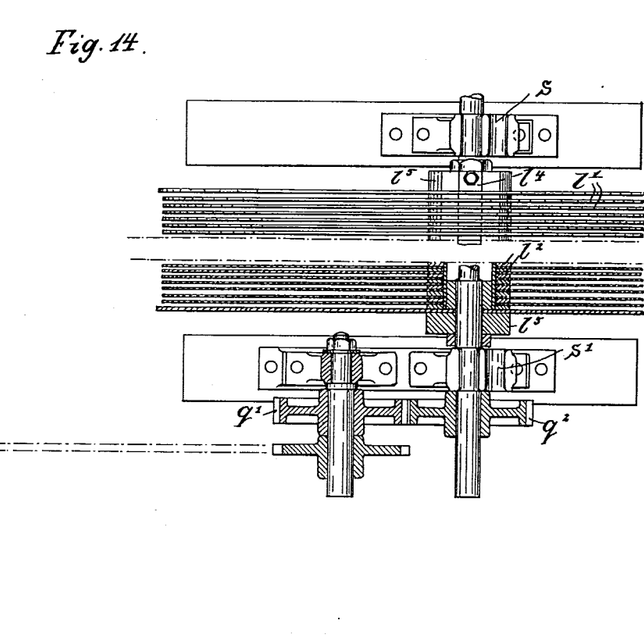
Figure 15:
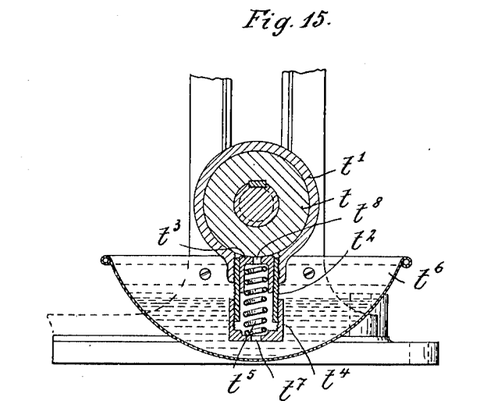
Figure 16:
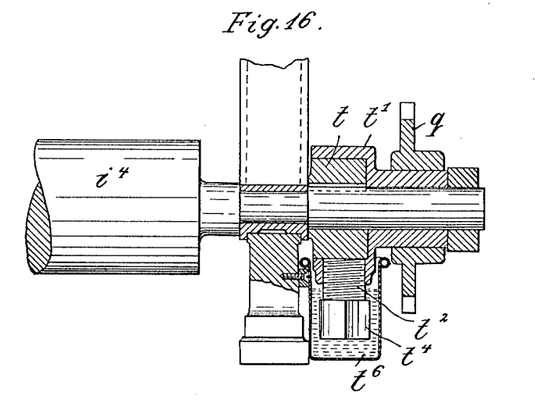

With the diameter of the rolls of band constantly increasing, as the winding on to the drum $l$ is going on, the stress put upon the several bands or strips will equally and gradually increase. To prevent such stress from exceeding the normal degree and to avoid breaking of the bands, an oil-brake is employed, as illustrated by Figs. 14, 15, and 16, the said brake being constructed as follows: Upon one trunnion of the roller $i^4$, outside of the drying chamber, is mounted a ring $t$, surrounded by a bushing $t^1$, having grooves in its inner surface. Upon the hub of said bushing the sprocket-wheel $q$ is mounted, transmitting motion, as already described, to the drum $l$, by means of the driving gears $q^1$, $q^2$. A sleeve $t^2$ is screwed into the bushing $t^1$, and within said sleeve a piston $t^3$ is arranged to slide, said piston having a bearing contact against the revolving ring $t$, under the constant pressure of a spring $t^5$, the tension of which may be varied by means of a screw-cap $t^4$ on the end of sleeve $t^2$. Owing to the frictional contact between the piston $t^3$ and rotating ring $t$, the bushing $t^1$ is carried along in the rotation of said ring and the sprocket-wheel $q$ on the hub of said bushing is caused to rotate accordingly. In its revolving motion, the said sleeve $t^2$ is made to pass through a cup or trough $t^6$ containing oil, which, through the small apertures $t^7$ in the cap $t^4$, and $t^8$ in the face of the piston $t^3$, constantly makes its way to the inside of the bushing $t^1$, thereby preventing the latter from becoming fast on the ring $t$. Now, if the stress put upon the bands by the drum $l$ exceeds a predetermined degree, the said stress will overcome the tension of the spring $t^5$ and the friction caused by said spring between the piston and ring $t$, thus causing the ring $t$ to freely turn within the bushing $t^1$ without carrying it along in its rotary motion. The sprocket-wheel $q$ and the drum $l$, accordingly, will be rotated only in accordance with the degree of stress to which the bands or strips at any time are subjected.

I claim as my invention:

1. In a machine for manufacturing priming bands, in combination, means for cutting separate bands from a blank of material, means for punching recesses at regular intervals in the bands and simultaneously roughening the edges of the recesses, means for delivering into said recesses globules of explosive matter, means for cross scoring the bands behind every globule deposited thereon, a drying apparatus, means for conveying the bands subsequent to the operation of the preceding means through said drying apparatus, means for coating the under sides of the bands after their passage through the drying apparatus with a suitable matter, a receiving drum, and means for finally delivering the finished bands to the receiving drum.

2. In a machine for manufacturing priming bands, the combination, with bands of flexible material, of a pair of punching rollers between which the bands are passed, one of the rollers carrying teeth so shaped as to punch recesses in the bands passing between the rollers and to roughen the edges of the recesses produced, and means for delivering into said recesses globules of explosive matter.

3. In a machine for manufacturing priming bands, the combination, with rollers adapted to cut separate bands from a blank of material, of rollers adapted to punch into said bands recesses for receiving the explosive matter and of a drum having means for delivering into said recesses globules of the explosive matter, substantially as and for the purpose set forth.

4. In a machine for manufacturing priming bands, a drum, means for revolving said drum, cylinders located inside said drum and acting as stirrers during the rotation of the drum, pistons adapted to slide within said cylinders, springs adapted to control said pistons within the cylinders, and delivering pins carried by said pistons, said pins being adapted to project from the drum for applying to the bands globules of the explosive matter, substantially as and for the purpose set forth.

5. In a machine for manufacturing priming bands, the combination, with a drum containing explosive material and provided with pistons for delivering explosive globules to the priming bands, the pistons being normally forced outwardly and in their outermost positions being inoperative to deliver the globules, of a support over which the priming bands are passed, and means for adjustably raising and lowering the support with relation to the drum and thereby regulating the degree of outward movement of the pistons as they pass over the support.

6. In a machine for manufacturing priming bands, the combination, with a drum containing the liquid explosive mass, of cylinders located inside said drum and radially projecting into the same, a piston adapted to slide within each of said cylinders, and a delivering pin carried by each of said pistons, the cylinders having apertures in their sides to admit the explosive matter into said cylinders, the apertures being so located to be closed by the descent of the pistons.

7. In a machine for manufacturing priming bands, the combination, with cutting rollers for cutting bands from a blank of material, of punching rollers for making recesses in the bands, a drum for delivering explosive matter into the said recesses, rollers for punching cross-scores into the said bands, a drying apparatus and means for conveying the bands through said drying apparatus, a tank to receive a coating substance, located within said drying apparatus, and means for coating the bands on their lower side with the substance in the tank, substantially as and for the purpose set forth.

8. In a machine for manufacturing priming bands, a receiving drum upon which the finished bands are wound and which comprises a plurality of disks mounted on a common shaft, spacing rings for supporting the disks, the latter having alining openings, and a cross ledge passed through the openings for retaining the ends of the bands to be wound up.

9. In a machine for manufacturing priming bands, the combination, with sundry instrumentalities for finishing the bands, a drum upon which the finished bands are to be wound, and a means for feeding the bands from the instrumentalities to the drum, of drum driving means operatively connected with the feeding means and including a gear element from which motion is directly transmitted to the drum, and an oil brake connection between the gear element and the feeding means for the purpose of preventing excessive stress on the bands.

In testimony whereof I have signed my name to this specification in the presence of two subscribing witnesses.

JULIUS OSWALD PRENZEL.

Witnesses:
 WOLDEMAR HAUPT,
 HENRY HASPER.

---

Copies of this patent may be obtained for five cents each, by addressing the "Commissioner of Patents, Washington, D. C."